United States Patent [19]

Yamabayashi et al.

[11] Patent Number: 5,759,348
[45] Date of Patent: Jun. 2, 1998

[54] AROMATIC POLYAMIDE PULP AND ITS PRODUCTION PROCESS

[75] Inventors: Toshiharu Yamabayashi; Kosaku Asagi, both of Ibaraki, Japan

[73] Assignee: Akzo Nobel nv, Arnhem, Netherlands

[21] Appl. No.: 676,163

[22] PCT Filed: Jan. 16, 1995

[86] PCT No.: PCT/EP95/00153

§ 371 Date: Aug. 27, 1996

§ 102(e) Date: Aug. 27, 1996

[87] PCT Pub. No.: WO95/19466

PCT Pub. Date: Jul. 20, 1995

[30] Foreign Application Priority Data

Jan. 17, 1994 [JP] Japan .................................. 6-003237

[51] Int. Cl.[6] .................................................. D21H 13/26
[52] U.S. Cl. ................................. 162/157.3; 162/164.3; 162/182; 427/212; 428/361; 428/378; 428/395
[58] Field of Search .......................... 162/157.2, 157.3, 162/164.3, 9, 182; 427/212; 428/361, 378, 395

[56] References Cited

U.S. PATENT DOCUMENTS

| | | | |
|---|---|---|---|
| 3,297,519 | 1/1967 | Rambosek et al. | 162/164 |
| 3,600,272 | 8/1971 | Cortigene et al. | 162/164 |
| 4,698,267 | 10/1987 | Tokarsky | 162/157.3 |
| 4,790,907 | 12/1988 | Mallen et al. | 162/157.2 |

FOREIGN PATENT DOCUMENTS

| | | | |
|---|---|---|---|
| 392559 | 10/1990 | European Pat. Off. | D01F 6/90 |
| 506975 | 10/1992 | European Pat. Off. | D01M 15/693 |
| 2017090 | 5/1970 | France | D21H 3/00 |
| 1520047 | 11/1969 | Germany | C08G 20/20 |
| WO 94/05854 | 3/1994 | WIPO | D21H 13/26 |

OTHER PUBLICATIONS

Derwent Patent Abstract 90–286150/38 (1990).
Derwent Patent Abstract 87–317629/45 (1987).
Derwent Patent Abstract 68–33771P (1968).
Derwent Patent Abstract 76–67530X/36 (1976).
Derwent Patent Abstract 87–310042/44 (1987).
Derwent Patent Abstract 88–231801/33 (1988).

*Primary Examiner*—Peter Chin
*Attorney, Agent, or Firm*—Richard P. Fennelly; Louis A. Morris

[57] ABSTRACT

The aromatic polyamide pulp obtained by the process of this invention is good in dispersibility in water and good in opening property, and excellent in dispersibility of inorganic filler and wettability with and adhesion to a matrix resin such as phenol resin. Hence, an impregnated paper and molded article excellent in homogeneity and mechanical strength can be produced. Also, in the case of friction materials free from paper-making step, the filler-retention of pulp in the production process is good and such a result that the filler-dispersibility and mechanical strength of molded article are excellent is obtained, and the pulp can be utilized particularly effectively in uses as asbestos-substitutes.

2 Claims, No Drawings

AROMATIC POLYAMIDE PULP AND ITS PRODUCTION PROCESS

This invention relates to an aromatic polyamide pulp surface-treated with an epoxy resin and to a process for producing the same. More particularly, it relates to an aromatic polyamide pulp which is easy to handle in the case where an aromatic polyamide pulp is dispersed and mixed with other materials as in friction materials, gasket and the like and which gives a product excellent in mechanical properties, and to a process for producing the same.

Aromatic polyamides such as polyparaphenylene terephthalamide, polymetaphenylene isophthalamide and the like referred to hereinafter as aramids in some cases) are known to be useful for fiber, pulp, film and the like which are excellent in heat resistance, mechanical characteristics, electric characteristics and the like. In particular, aramid pulp obtained by fibrillating aramid fibers is useful as asbestos-substitutes. Processes for producing aramid pulp have heretofore been proposed. As an example, Japanese Patent Application Kokoku No. 59-603 discloses a process for producing aramid pulp by forming a film-like material or a monofilament from an optically anisotropic dope of para-aromatic polyamide and then fibrillating the film-like material or monofilament by a mechanical shear force. Also, Japanese Patent Application Kokai No. 2-200,809 discloses a process for producing aramid pulp directly from a solution of a polymer of a meta-aromatic polyamide, and apparatus to be used therein. When aramid fibers are to be used as reinforcing fibers, it is important that the aramid fibers are excellent in wettability with and adhesiveness to a resin or rubber which is a matrix, and from this view point, various methods have been proposed for the purpose of improving the wettability and adhesiveness between aramid fiber and matrix.

For example, Japanese Patent Application Kokai No. 62-218,425 discloses a method of improving the adhesiveness between an aramid material and an epoxy resin in applying the epoxy resin to the surface of an aramid material (short fiber, long fiber, woven fabric, sheet or the like) by immersing in or spray-coating with an organic solvent solution of an epoxy resin and also applying a heat-treatment thereto in said case. In addition, Japanese Patent Application Kokai No. 62-225,539 discloses a method of improving the adhesiveness of an aramid material to an epoxy resin by heat-treating the aramid material in the presence of an ammonia gas in the application of an epoxy resin to the surface of the aramid material. However, all these methods are concerned with treatment of aramid fibers having a fiber diameter of about 12 μm, and when these methods are applied to highly fibrillated aramid pulp having a fiber diameter of 1 μm or less, the fibrils are adhered to one another to cause a problem of impairing the dispersibility and opening property of the aramid pulp, so that it is difficult to apply the above methods as they are to the aramid pulp.

The object of this invention is to provide an aramid pulp which is used as an asbestos-substitute for friction materials, gaskets and the like and suitable for producing a product excellent in wettability with and adhesiveness to a matrix, such as phenol resin and rubber, and also excellent in inorganic filler retention and exhibits high mechanical properties without impairing the dispersibility and opening property of the aramid pulp.

These and other objects are achieved by the invention, which is summarized as follows.

(1) An aromatic polyamide pulp characterized by having been surface-treated with an epoxy resin whose glycidyl groups have been partially hydrolyzed and having a water content of less than 30% by weight.

(2) A process for producing an aromatic polyamide pulp surface-treated with an epoxy resin and having a water content of less than 30% by weight, characterized by dispersing an aromatic polyamide pulp in an aqueous epoxy 20 resin emulsion, and subjecting the same to filtering, dehydrating, drying and opening.

(3) A process for producing an aromatic polyamide pulp according to (2) above wherein an aqueous emulsion of an epoxy resin whose glycidyl groups have been partially hydrolyzed is used.

This invention is explained in detail below. The aramid used in this invention, that is, the total aromatic polyamide, is such that 85 mole % or more of the amide bonds are obtained from an aromatic ring diamine and aromatic ring dicarboxylic acid components.

Specific examples thereof include polyparaphenylene terephthalamide, polymetaphenylene terephthalamide, polyparabenzamide, poly-4,4'-diaminobenzanilide, polyparaphenylene-2,6-naphthalic amide, copolyparaphenylene/4,4' (3,3'-dimethylbiphenylene) terephthalamide, copolyparaphenylene/2,5-pyridylene terephthalamide, polyorthophenylene phthalamide, poly-metaphenylene phthalamide, poly paraphenylene phthalamide, polyorthophenylene isophthalamide, polymetaphenylene isophthalamide, polyparaphenylene isophthalamide, polyorthophenylene terephthalamide, poly-1,5-naphthalene phthalamide, poly-4,4'-diphenylene orthophthalamide, poly-4,4'-diphenylene isophthalamide, poly-1,4-naphthalene phthalamide, poly-1,4-naphthalene isophthalamide, poly-1,5-naphthalene isophthalamide and the like; aromatic polyamides containing alicyclic amine, representatives of which are the above-mentioned aromatic diamines whose benzene nucleus has been partially replaced with piperazine, 1,5-dimethylpiperazine or 2,5-diethylenepiperazine; copolymers of aromatic polyamide containing two phenyl groups in which the aromatic diamines are bonded through an ether linkage such as 3,3' oxydiphenylenediamine, 3,4'-oxydiphenylenediamine or the like, or a group such as —S—, —SO2—, —CO—, —NH— or the like, for example, poly-3,3'-oxydiphenylene terephthalamide/polyparaphenylene terephthalamide copolymer, poly-3,4-oxydiphenylene terephthalamide/polyparaphenylene terephthalamide copolymer; and the like.

The term "aramid pulp" used herein means one having the form that aramid fibers are highly fibrillated, whose specific surface area as measured by the BET method is preferably 3 to 25 m²/g, and whose freeness as measured by the Canadian standard method in the "Pulp Freeness Test Method" of JIS P 8121 is preferably 40 to 700 ml, more preferably 100 to 700 ml, and most preferably 150–700 ml.

The process for producing the aramid pulp is not particularly limited and such processes as mentioned in, for example, Japanese Patent Application Kokoku No. 59 603, Japanese Patent Application Kokoku No. 2-200,809 and the like can be applied.

The epoxy resin for preparing the aqueous epoxy resin emulsion used in this invention is not limited as far as it can achieve the purpose of this invention. For example, the following can be used:

Bisphenol A type liquid epoxy resins such as Sumiepoxy ELA-128 (trade name of Sumitomo Chemical Co., Ltd.) and the like; bisphenol A type solid epoxy resins such as Sumiepoxy ELA-012 (trade name of Sumitomo Chemical Co., Ltd.) and the like; orthocresol novolak type epoxy resins such as Sumiepoxy ESCN-220L (trade name of Sumitomo Chemical Co., Ltd.) and the like; triglycidylamine type epoxy resins such as Sumiepoxy ELM-120 (trade name of Sumitomo Chemical Co., Ltd.) and the like; tetraglycidylamine type epoxy resins such as Sumiepoxy ELM-434 (trade name of Sumitomo Chemical Co., Ltd.) and the like; etc.

Among them, the tetrafunctional tetraglycidylamine type epoxy resin is preferred in respect of enhancing adhesiveness. Furthermore, the epoxy equivalents of these epoxy resins are preferably 1,000 g/eq. or less. When the epoxy equivalent exceeds 1,000 g/eq., a sufficient adhesiveness to a matrix cannot be obtained.

As the method of producing an aqueous emulsion using the above epoxy resin, there can be applied a generally used method as it is. That is, an aqueous epoxy resin emulsion is obtained, for example, by dispersing an epoxy resin in water by a high speed stirring in the presence of a nonionic surface active agent such as an ether compound of polyoxyethylene and a higher fatty acid alcohol or the like.

In this case, the epoxy resin/surface active agent composition ratio by weight may be varied depending upon the kind of epoxy resin and the kind of surface active agent; however, in view of the stability and adhesiveness of emulsion, the composition ratio is preferably selected in the range of 97/3 to 70/30. It is also possible to use commercially available epoxy resin emulsions such as ANS-1001 and ANS-1006 (trade names of Takemoto Yushi K. K.) and the like which are emulsions of an epoxy resin. In view of uniformity of treatment, the particle size of emulsion is preferably 15 μm or less in diameter, more preferably 5 μm or less in diameter. In order to increase the amount of the epoxy resin adsorbed on the pulp in the treating solution, it is particularly preferable to use an emulsion of an epoxy resin whose glycidyl groups have been partially hydrolyzed into glycol groups because in this case the epoxy resin is 100% adsorbed on the aramid pulp without using no other particular means. As a method for preparing the emulsion of an epoxy resin whose glycidyl groups have been partially hydrolyzed into glycol groups, there can be used a method of preparing an emulsion dispersion using as the starting material an epoxy resin hydrolyzed by a generally known method. It is also possible to use a method comprising preparing an epoxy resin emulsion by a conventional method as described below and then hydrolyzing the resulting emulsion. According to the latter method, a uniform, stable emulsion can be obtained easily. In order to hydrolyze the emulsion, various methods can be used depending upon the kind of the emulsion and it is the simplest and preferable to subject the emulsion as such to heat-treatment. As a result of hydrolysis, a part of the epoxy groups of the epoxy resin is split to a glycol group. The reaction percentage of the hydrolysis is preferably 10% or more, more preferably at least 20% but less than 90%, of the initially existing epoxy groups.

When the hydrolysis is insufficient, the adsorption of the resin on the pulp tends to become insufficient, and when the hydrolysis is excessive, the performance of the treated pulp such as adhesiveness of the pulp to phenol resin or the like is reduced. In the hydrolysis, an increase of the molecular weight of the epoxy resin due to condensation reaction is caused simultaneously with the formation of glycol groups; however, as far as it does not adversely affect the stability of the emulsion it has no particular problem in this invention. The reaction percentage of hydrolysis can be calculated from the following equation by measuring the epoxy equivalents:

Conversion (%)=100×{1−(WPEi/WPEx)} wherein WPEi is the initial epoxy equivalent and WPEx is the epoxy equivalent after the hydrolysis.

The suitable hydrolysis conditions are varied depending upon the kind of the epoxy resin used, the kind of surface active agent used, the compositions and concentrations thereof and the like and are not always limited. As an example thereof, in the case of a nonionic emulsion of Sumiepoxy ELM-434 (trade name of Sumitomo Chemical Co., Ltd.) and ANS-1006 (manufactured by Take moto Yushi K. K.), which are tetraglycidylamine type epoxy resins, the hydrolysis can be effected in the following manner: The emulsion can be heat-treated at a temperature of 65OC for 130 hours to obtain an emulsion of an epoxy resin whose objective glycidyl groups have been partially hydrolyzed into glycol groups. By this treatment, the epoxy equivalent is increased from about 120 g/eq. to about 240 g/eq. In this case, the reaction percentage is about 50%. Also, the same effect can be obtained by allowing the epoxy resin emulsion to stand at room temperature for 3 to 6 months. Moreover, a catalyst such as an acid, an alkali, an amine or the like can be used to promote the hydrolysis reaction.

The treatment of aramid pulp with the above-mentioned epoxy resin emulsion, the glycidyl groups of which have been partially hydrolyzed, is effected, for example, by the following method: First of all, the aramid pulp is dispersed in water to the extent that a sufficient fluidity is obtained. The concentration of the aramid pulp dispersed in the dispersion is varied depending upon the specific surface area and freeness of the pulp used, and is preferably selected in the range of 0.5 to 5% by weight. In order to uniformly disperse the pulp, a conventional propeller type stirrer can be used. A beater for pulp which is used for dispersing usual linter pulp is particularly effective for achieving the uniform dispersion.

Subsequently, while the dispersion is stirred, the desired amount of the above-mentioned epoxy emulsion, the glycidyl groups of which have been partially hydrolyzed, is dropwise added. The amount of the emulsion added is such that the amount of the epoxy resin adhered is preferably 0.3 to 20% by weight, more preferably 0.5 to 10% by weight and most preferably 1 to 6% by weight, based on the absolute dry weight of pulp. When the amount of the epoxy resin adhered is 0.3% by weight or less, the desired mechanical properties are not achieved and a sufficient epoxy resin treating effect is not obtained. When it is 20% by weight or more, it shows a tendency that the dispersibility of the pulp becomes bad, and an effect corresponding to the amount of the resin adhered is not obtained, so that it is inferior in economy.

After completion of the dropwise addition of the emulsion, the stirring of the emulsion is continued as it is for 5 to 60 minutes to adsorb the epoxy resin on the pulp surface. According to the process of this invention, the epoxy resin is substantially 100% adsorbed on the aramid pulp surface only by the above treatment. By treating the aramid pulp with the epoxy resin emulsion, it is possible to produce an aromatic polyamide pulp excellent in adhesiveness to phenol resin or the like.

After the adsorption of the emulsion, the dispersion is filtered in a conventional manner. The thus filtered surface-treated aramid pulp is subjected to a dehydrator such as a centrifugal separator or the like to reduce the water content and then dried so that the water content becomes less than 30% by weight, preferably 3% by weight or more but 10% by weight or less. When the water content is too low, the electrostatic property is deteriorated and handling becomes difficult, and when it is too high, the opening property and compatibility with a filler tend to be deteriorated.

The drying temperature may be varied depending upon the kind of the epoxy resin used for the surface treatment; however, in general, it is preferably conducted at a temperature of 100° C. or lower, more preferably 50° C. or lower. When the drying temperature is too high, the curing and fusion of the epoxy resin is caused, so that the subsequent opening treatment becomes insufficient. Hence, even when used in friction materials, gaskets and the like, the dispersion of pulp becomes ununiform and in addition the expected adhesion effect is not obtained in some cases. In order to shorten the drying time, the surfacetreated aramid pulp which has been dehydrated can be formed into small blocks and then dried in a conventional oven. Also, according to a method using an apparatus in which much wind is sent such as a fluidized bed, it is possible to conduct drying around room temperature in a relatively short period of time.

The surface-treated aramid pulp which has been dried is subsequently subjected to opening. In the convention al surface-treatment which has heretofore been conducted, fibrils of pulp are adhered to one another during the drying, and hence, sufficient opening is impossible; how ever, since in the surface-treated aramid pulp according to this invention, the particles of the epoxy resin attached to the surface of the pulp are fine, even when the pulp is subjected to opening in the following manner, a pulp having the same dispersibility and filler-retention as untreated pulp is obtained.

The opening can be conducted by use of a grinding apparatus such as hammer mill, ACM pulverizer, corn mill, roll crusher, screw intermediate pulverizer, ring-roller mill, stamp mill, rod mill, impact crusher, jet mill, edge runner, tower type mill, colloid mill or the like; a fixed type mixer in which mixing is conducted by rotating a screw, a ribbon, a finger prong, a Z-shaped blade or the like in a cylindrical or gutter-like vessel; or the like.

Preferably, preliminary opening is conducted by the fixed type mixer and thereafter the main opening is conducted by means of a pulverizer such as jet mil or the like, whereby favorably opened aramid pulp which has been surface-treated with an epoxy resin is obtained; however, the process of this invention is not limited thereto.

The surface-treated aramid pulp of this invention has a high absorption between epoxy resin and aramid pulp, and hence, the epoxy resin is not stripped from the surface of the aramid pulp even when subjected to the above opening treatment, and the performance of the pulp is not affected at all by the opening treatment.

The opened, surface-treated aramid pulp can be compressed by an appropriate method to facilitate the handling in conveyance, weighing and the like. Even when the surface-treated aramid pulp of this invention is compressed to a bulk density of 0.05 to 0.1 g/cc, the dispersibility and the like in practical use are not affected thereby.

EXAMPLES

This invention is explained in more detail below referring to Examples, and in the Examples, the evaluation of aramid pulp was conducted by the methods described below.
Method of evaluating aramid pulp
1. Evaluation method 1
Evaluation of length at break of aramid pulp/inorganic filler composite paper
(1) Papermaking Aramid pulp in an amount corresponding to 6.25 g of pulp in terms of absolute dry weight and 4.2 g to 8.0 g of diatomaceous earth (the weight was adjusted so that the weight ratio of the pulp/diatomaceous earth after papermaking became 60/40 depending on the filler-retention of the pulp used) were weighed and dispersed in one liter of water at 3,000 rpm for 3 minutes in a 2-liter capacity standard pulp beater (manufactured by Kumagai Riki Kogyo K. K.). Subsequently, papermaking was conducted in a conventional manner using a 25-cm square shaped sheet machine (manufactured by Kumagai Riki Kogyo K. K.) and a # 80-mesh wire net, and thereafter dried at 120° C. for two hours to obtain a 25-cm square aramid paper/diatomaceous earth composite paper (weight ratio of aramid pulp/ diatomaceous earth: about 60/40) having a 5 unit weight of about 167 g/m2.

(2) Tensile test

The necessary sheets of test piece having a size of 15×200 mm were cut from the above aramid pulp/diatomaceous earth composite paper and the basis weight was determined. Subsequently, a tensile test was conducted under the following conditions to determine the length at break by the following equation:

Test piece size: 15 mm×200 mm

Gauge length: 100 mm

Crosshead speed: 10 mm/min

Breaking Length (km) [tensile load (kgf)]/[test piece width (mm)× test specimen basis weight (g/m2)]×1000

2. Evaluation method 2
Evaluation using aramid pulp/inorganic filler/phenol resin clutch facing model molded article
(1) Paper-making Aramid pulp of a weight corresponding to 6.25 g of pulp in terms of absolute dry weight and 4.2 g to 8.0 g of diatomaceous earth (the weight was adjusted so that the pulp/diatomaceous earth weight ratio after paper making became 60/40 depending on the filler-retention of the pulp used) were weighed, and then dispersed in one liter of water at 3,000 rpm for three minutes in a 2 liter capacity standard pulp beater (manufactured by Kumagai Riki Kogyo K. K.). Subsequently, the dispersion was subjected to papermaking in a conventional manner in a square shaped sheet machine of 25-cm square (manufactured by Kumagai Riki Kogyo K. K.) using a # 80-mesh wire net, and thereafter dried at 120° C. for two hours to obtain a 25-cm square aramid pulp/diatomaceous earth composite paper (aramid/ diatomaceous earth weight ratio: about 60/40) having a unit weight of about 167 g/m$^2$.

(2) Impregnation with phenol resin

Several sheets of a sample of a size of 50 mm×100 mm were cut from the above aramid paper and weighed. Subsequently, a 45% methanol solution of a modified resol type phenol resin [PR-SCI-3 (trade name of Sumitomo Durez Co., Ltd.)] was prepared by dilution. The above composite paper sample sheets were uniformly impregnated with this resin solution so that the aramid pulp/diatomaceous earth/resin weight ratio became 60/40/35, and then dried at 50° C. for 30 minutes to prepare an impregnated prepreg.

(3) Press-molding

Two sheets of the above prepreg were put one on the other, a spacer of 0.6 mm in thickness was placed and the resulting assembly was press-molded at 180° C. and at 100 Kgf/cm$^2$ for five minutes, and thereafter treated in an oven at 180° C. for two hours to post-cure the resin, there by obtaining a clutch facing model molded article having a porosity of 50%.

(4) Tensile test

The tensile strength of the molded article obtained by the above method was measured under the following conditions:

Test piece size: 10 mm×100 mm
Gauge length: 50 mm
Crosshead speed: 5 mm/min

3. Evaluation method 3 (measurement of freeness)

The freeness of aramid pulp was measured according to the Canadian standard method in the "Pulp Freeness Test Method" of JIS P 8121.

4. Evaluation method 4 (Measurement of amount of epoxy resin adhered)

The amount of the epoxy resin adhered to the aramid pulp was determined by the following equation form the COD of the filtrate after the surface-treatment and COD of the epoxy emulsion used in the surface-treatment: Amount of epoxy resin adhered (%)=Ew/(Pw+Ew)×(1−Ta/Tb)×100, wherein Ew: Weight of epoxy resin solids in epoxy resin emulsion (g)
Pw: Weight of pulp used in surface-treatment (g)
Ta: COD of filtrate after surface-treatment (mg/l)
Tb: COD of epoxy resin emulsion used in surface-treatment (mg/l)

5. Evaluation method 5 (evaluation of friction material in the form of model molded article)

By the following method, a model molded article of a friction material was prepared and the performance there 5 of was evaluated:

(1) Composition (% by weight)

| | |
|---|---|
| Aramid pulp | 5.0 |
| Rock wool RF-5164 (manufactured by Tsuchiya Kaolin K. K.) | 5.0 |
| Barium sulfate | 47.5 |
| Kaolin | 32.5 |
| Phenol resin PR-50252 (Sumitomo Durez) | 10.0 |

(2) Mixing

In a Lodige Ploughshare mixer M-20 Model (Matsuzaka Boeki K.K.) were placed 100 g of pulp, 100 g of rock wool, 950 g of barium sulfate, 650 g of kaolin and 200 g of phenol resin (2 kg in total), and they were mixed at 230 rpm (main shaft) at 6,000 rpm (chopper) for five minutes to obtain a mixture.

(3) Measurement of filler-retention of mixture

In order to evaluate the stability of the mixture, the filler-retention of the mixture was measured by the following method:

1) A 60-mesh (0.25 mm) screen having a diameter of 100 mm was set in a SHAKER VXR type shaker (manufactured by JANKE & KUNKEL GMBH & CO.).
2) 20 g of the mixture sample was weighed (W1), and put on the screen.
3) The screen was shaken at 1,600 rpm for ten minutes.
4) Powder which fell on a receiver was weighed (W2).
5) Subsequently, the filler-retention was calculated. Filler-retention ={(W1-W2)/W1}×100

(4) Measurement of load at break of preform

For evaluating the handleability of preform, a preform was prepared by the following method and the load at which it was broken was measured:

1) In a mold of 100 mm in width, 150 mm in length and 50 mm in depth was placed 200 g of the mixture.
2) The mixture was pressed at room temperature at 270 kgf/cm2 for 15 minutes to obtain a preform of 7 mm in thickness.
3) The preform thus obtained was subjected to flex test under the following conditions to determine the load at break:
Span: 120 mm
Crosshead speed: 10 mm/min Test piece size: 100 mm×150 mm×7 mm (5) Evaluation of dispersibility For evaluating the dispersibility of pulp, a molded article was prepared and evaluated by the following method:

1) In a mold of 15 mm in width, 150 mm in length and 50 mm in depth was placed 33 g of the mixture.
2) The mixture was heat-pressed at 130OC at 45 kgf/cm2 for 15 minutes to obtain a molded article having a thickness of 12 mm.
3) The molded article was post-cured in an oven at 180° C. for one hour to complete the curing of the phenol resin.
4) The molded article thus obtained was mechanically divided into two parts with a chisel or the like and the broken face obtained was observed to count the number of pills of aramid pulp having a size of not less than 1 mm in diameter, thereby evaluating the dispersibility of pulp.

6. Evaluation method 6 (Measurement of water content)

The water content referred to herein can be determined by the following calculation equation:

Water content (wt. %)={(W1 −W2)/W1 }×100 wherein
W1: Weight of pulp in the hydrous form.
W2: Weight of pulp after absolute drying.

EXAMPLE 1

In 100 liters of deionized water was dispersed 1.007 kg of Twaron 1099 [trade name of Nippon Aramid Yugen Kaisha for pulp of poly(paraphenylene terephthalamide) having a specific surface area by the BET method of 16 m2/g and a water content of 6% by weight] in a 200-liter reactor. To this aramid pulp dispersion was dropwise added with stirring 313 g of a tetraglycidyl amine type epoxy resin emulsion dispersion whose epoxy equivalent was adjusted to 270 g/eq. by heat-treatment at 65° C. for 130 hours [ANS 1006 20 (trade name of Takemoto Yushi K. K.)], and thereafter, the stirring was continued at room temperature for 30 minutes. Subsequently, the dispersion was filtered and the pulp separated by filtration was dehydrated so that the water content became about 50% by weight to obtain a water-containing aramid pulp which had been surfacetreated with an epoxy resin whose glycidyl groups had been partially hydrolyzed.

This water-containing aramid pulp was dried at 50° C. until the water became 6% by weight, and thereafter, subjected to preliminary opening by means of Universal Mixer EM25B Model (manufactured by TSUKISHIMA KIKAI CO., LTD.) and then to main opening by means of a single track jet mill STJ-200 Model (manufactured by Seishin Kigyo K. K.) to obtain an opened aramid pulp surfacetreated with an epoxy resin which pulp had a water content of 5% by weight. The aramid pulp thus obtained was evaluated by the above-mentioned methods (1) to (5) to obtain the results shown in Table 1.

EXAMPLE 2

The same treatment as in Example 1 was applied to Twaron 1095 (trade name of Nippon Aramid Yugen Kaisha for pulp of polyparaphenylene terephthalamide having a specific surface area by the BET method of 6 m2/g and a water content of 6% by weight), and the evaluation was conducted by the above methods to obtain the results 21 shown in Table 1.

Comparative Example 1

Twaron D1099 (the same as above) which had not been subjected to the surface-treatment with the epoxy resin was evaluated by the above methods to obtain the results shown in Table 1.

Comparative Example 2

Twaron 1095 (the same as above) which had not been subjected to surface-treatment with the epoxy resin was evaluated by the above methods to obtain the results shown in Table 1.

Comparative Example 3

The same procedure as in Example 1 was repeated, except that a tetraglycidyl type epoxy resin emulsion dispersion which had not been subjected to heat-treatment and hence not hydrolyzed |ANS-1006 (trade name of Takemoto Yushi K. K., epoxy equivalent: 130 g/eq.) was used as it was, to obtain an aramid pulp surface-treated with the epoxy resin. This aramid pulp was evaluated by the above methods to obtain the results shown in Table 1.

TABLE 1

|  | Ex. 1 | Comp. Ex. 1 | Comp. Ex. 3 | Ex. 2 | Comp. Ex. 2 |
|---|---|---|---|---|---|
| Breaking length of composite paper (km) | 0.22 | 0.17 | — | 0.15 | 0.04 |
| Tensile strength of resin-impregnated model molded article (kgf/mm2) | 4.0 | 3.3 | 3.6 | 3.5 | 3.3 |
| Freeness (ml) | 350 | 350 | 90 | 600 | 580 |
| Amount of epoxy resin adhered (%) | 5 | 0 | 3 | 5 | 0 |
| COD of filtrate (mg/l) | 6 | — | 460 | 7 | — |
| COD of epoxy emulsion (ml/l) | 950 | — | 950 | 950 | — |
| Characteristics of friction material model molded article |  |  |  |  |  |
| Filler-retention (%) | 8 | 8 | 76 | 50 | 50 |
| Load at break of perform (kgf) | 2.7 | 2.4 | 2.5 | 2.2 | 2.2 |
| Dispersibility (number of pills) | 0 | 0 | 4 | 0 | 0 |

We claim:

1. An aromatic polyamide pulp, characterized by having been surface treated with an epoxy resin whose glycidyl groups have been partially hydrolyzed from at least 10% to less than 90% of the initially existing epoxy groups to increase the amount of the epoxy resin adsorbed on the pulp so that the amount of epoxy resin that is adhered to the pulp is from 0.3% to 20%, by weight, based on the absolute dry weight of pulp, and having a water content of less than 30% by weight.

2. A process for producing an aromatic polyamide pulp surface treated with an epoxy resin whose glycidyl groups have been partially hydrolyzed from at least 10% to less than 90% of the initially existing epoxy groups to increase the amount of the epoxy resin adsorbed on the pulp so that the amount of epoxy resin that is adhered to the pulp is from 0.3% to 20%, by weight, based on the absolute dry weight of pulp, and having a water content of less than 30% by weight, characterized by dispersing an aromatic polyamide in an aqueous epoxy resin emulsion, and then subjecting the dispersion to filtration, dehydration, drying and opening.

* * * * *